United States Patent
Lee (10) Patent No.: US 9,766,730 B2
(45) Date of Patent: Sep. 19, 2017

(54) DISPLAY DEVICE WITH TOUCH PANEL AND METHOD FOR CONVERTING DRIVING FREQUENCY OF TOUCH PANEL

(71) Applicant: SAMSUNG DISPLAY CO., LTD., Yongin, Gyeonggi-Do (KR)

(72) Inventor: Ji Gong Lee, Cheonan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 93 days.

(21) Appl. No.: 14/631,017

(22) Filed: Feb. 25, 2015

(65) Prior Publication Data

US 2016/0077617 A1 Mar. 17, 2016

(30) Foreign Application Priority Data

Sep. 16, 2014 (KR) .......................... 10-2014-0122800

(51) Int. Cl.
G06F 3/041 (2006.01)
G06F 3/044 (2006.01)

(52) U.S. Cl.
CPC .............. G06F 3/041 (2013.01); G06F 3/044 (2013.01); G06F 3/0416 (2013.01)

(58) Field of Classification Search
CPC ......... G06F 3/041; G06F 3/0416; G06F 3/044
See application file for complete search history.

(56) References Cited

U.S. PATENT DOCUMENTS

| 2007/0120839 A1* | 5/2007 | Liao | G09G 5/006 345/213 |
| 2011/0187700 A1* | 8/2011 | Kumakawa | G09G 5/006 345/214 |
| 2013/0069894 A1* | 3/2013 | Chen | G06F 3/0412 345/173 |
| 2013/0215333 A1* | 8/2013 | Kurokawa | H04N 5/66 348/739 |
| 2013/0221993 A1 | 8/2013 | Ksondzyk et al. | |
| 2014/0253498 A1* | 9/2014 | Suzuki | G06F 3/044 345/174 |

FOREIGN PATENT DOCUMENTS

| JP | 2012-221423 | 11/2012 |
| JP | 2014-041555 | 3/2014 |
| KR | 10-2014-0045076 A | 4/2014 |

* cited by examiner

*Primary Examiner* — Rodney Amadiz
(74) *Attorney, Agent, or Firm* — Lee & Morse, P.C.

(57) ABSTRACT

A method for converting a driving frequency of a touch panel includes receiving a control signal for a display porch time, changing the display porch time based on the control signal, changing a cycle of the horizontal synchronizing signal based on the changed display porch time, and generating a touch driving signal synchronized with the horizontal synchronizing signal.

14 Claims, 8 Drawing Sheets

DISPLAY DEVICE WITH TOUCH PANEL AND METHOD FOR CONVERTING DRIVING FREQUENCY OF TOUCH PANEL

CROSS-REFERENCE TO RELATED APPLICATION

Korean Patent Application No. 10-2014-0122800, filed on Sep. 16, 2014, and entitled, "Display Device with Touch Panel and Method for Converting Driving Frequency of Touch Panel," is incorporated by reference herein in its entirety.

BACKGROUND

1. Field

One or more embodiments described herein relate to a display device with a touch panel and a method for converting the driving frequency of a touch panel.

2. Description of the Related Art

A variety of flat panel displays have been developed. Examples include liquid crystal displays, organic light emitting diode (OLED) displays, and electrophoretic displays. Each of these displays generates an image using an electro-optical active layer. A liquid crystal display uses a liquid crystal layer as an electro-optical active layer. An OLED display uses an organic emission layer as an electro-optical active layer. An electrophoretic display uses an active layer including charged particles. In these displays, a field-generating electrode is connected to a switching element (e.g., a thin film transistor) which receives a data signal. The active layer converts the data signal to an optical signal for displaying an image.

These or other types of displays may perform a touch sensing function based on user interaction. The touch sensing function may be performed to determine contact information (e.g., whether an object contacts a screen, the position of the contact, etc.). The contact information may be determined by sensing a change in pressure, charges, light, or other conditions, on a display screen. This may occur, for example, when a user writes text or draws a figure by contacting the screen with a finger or a touch pen. The display may receive an image signal based on the contact information.

The touch sensing function may be implemented by a sensor. The sensor may be, for example, a resistive type, capacitive type, electro-magnetic (EM) type, or optical type of sensor. The capacitive-type sensor includes a sensing capacitor which may included, for example, a sensing electrode for transferring the sensing signal. This sensor may determine contact, a contact position, and the like, by sensing a change in the capacitance of the sensing capacitor when an object (e.g., a finger or stylus) approaches and contacts the sensor. However, in the capacitive-type sensor, there is a problem in that a user touch may not be sensed because of display noise and/or external noise.

SUMMARY

In accordance with one embodiment, a method for converting a driving frequency of a touch panel includes receiving a control signal for a display porch time, changing the display porch time based on the control signal, changing a cycle of the horizontal synchronizing signal based on the changed display porch time, and generating a touch driving signal synchronized with the horizontal synchronizing signal. The method may include maintaining a display frame rate during changing of the display porch time.

The horizontal synchronizing signal may include a first number of pulses in a first period of the display porch time and may include a second number of pulses in a second period of the display porch time. The first number may be greater than the second number. The horizontal synchronizing signal may include a third number of pulses in third period between the first and second periods of the display porch time, and the third number of pulses may overlap a period which includes a pulse of a vertical synchronizing signal. The third number may be between the first and second numbers. The display porch time may exclude a display time in a frame period. The display time may include a time for writing data in one or more lines of a display.

In accordance with another embodiment, a display device with a touch panel includes a display to display an image, a touch sensor to sense a touch, a driver to control the display, and a touch driver to provide a touch driving signal to the touch sensor, the touch driving signal synchronized with a horizontal synchronizing signal, wherein the touch driver is to provide a control signal of a display porch time to the driver, and wherein the driver is to change the display porch time based on the control signal. Changing the display porch time may change a cycle of the horizontal synchronizing signal. The driver may change the display porch time while a display frame rate is maintained.

The horizontal synchronizing signal may include a first number of pulses in a first period of the display porch time and may include a second number of pulses in a second period of the display porch time. The first number may be greater than the second number. The horizontal synchronizing signal may include a third number of pulses in third period between the first and second periods of the display porch time, and the third number of pulses may overlap a period which includes a pulse of a vertical synchronizing signal. The third number may be between the first and second numbers. The display porch time may exclude a display time in a frame period. The display time may include a time for writing data in one or more lines of a display.

In accordance with another embodiment, a method for converting a driving frequency of a touch panel includes receiving an instruction for a touch driving signal, and converting a frequency of the touch driving signal based on the instruction. The touch driving signal is synchronized with a horizontal synchronizing signal, which includes a first pulse that repeats at a substantially constant cycle. The touch driving signal includes N second pulses temporally positioned in a corresponding cycle of the horizontal synchronizing signal. A first distance from a first edge of one of the second pulses to a first edge of an adjacent one of the second pulses is substantially constant. Converting the frequency of the touch driving signal includes changing the first distance. The N second pulses may be greater than or equal to one.

The method may include receiving a control signal for a display porch time; and changing the display porch time based on the control signal. A distance from the first edge of the N-th second pulse to the first edge of a first pulse starting a next cycle of the horizontal synchronizing signal may be greater than the first distance. A distance from the first edge of the N-th second pulse to the first edge of a first pulse starting a next cycle of the horizontal synchronizing signal may substantially equal the first distance.

The N second pulses may be positioned in a corresponding period of the horizontal synchronizing signal in a non-overlapping relationship with an expected noise period.

The expected noise period may be a noise period expected to be generated by applying at least one of a data signal or a gate signal.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

Figure 1:
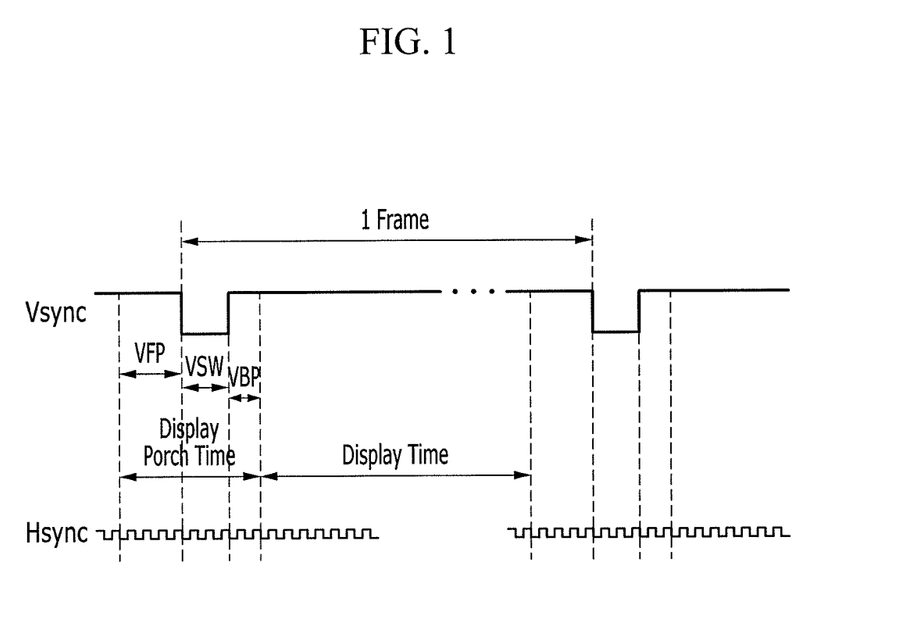
FIG. 1 illustrates an example of a display porch time and a display time.

FIG. 1 illustrates an example of a display porch time and a display time. In FIG. 1, pulse timings are shown for a vertical synchronization signal Vsync and a horizontal synchronizing signal Hsync.

The vertical synchronization signal Vsync determines 1 frame period of a display panel. For example, a cycle of the pulse of the vertical synchronization signal Vsync may be set to be 1 frame period. A frequency having such a frame period as a cycle may be referred to as a display frame rate.

The horizontal synchronizing signal Hsync is a signal which determines 1 horizontal period for writing data in pixels of 1 line of the display panel. For example, a period of the pulse of the horizontal synchronizing signal Hsync may be set to be 1 horizontal period.

A display time may be determined as a period set by multiplying 1 horizontal period by the number of lines of the display panel. For example, the display time may be a period for writing data in all lines of the display panel.

A display porch time may be a period which excludes the display time in the 1 frame period. For example, the display porch time may be a period which excludes a time for writing data in each line of the display panel. The display porch time may referred to as a V-Porch.

As illustrated in FIG. 1, in this embodiment, the display porch time includes periods of Vsync front porch (VFP), VSync width (VSW), and Vsync back porch (VBP). In other embodiments, the configuration of the display porch time may vary. For example, the configuration of the display porch time may vary based on characteristics of the display panel and/or a driving type.

Lengths of the VFP, the VSW, and the VBP may be expressed, for example, by the number of pulses of the horizontal synchronizing signal Hsync in each of their periods. For example, in FIG. 1, the length of the VFP is four pulses of the horizontal synchronizing signal Hsync. The length of the VSW is three pulses of the horizontal synchronizing signal Hsync. The length of the VBP is two pulses of the horizontal synchronizing signal Hsync. Thus, the length of the display porch time may be nine pulses of the horizontal synchronizing signal Hsync.

Figure 2:
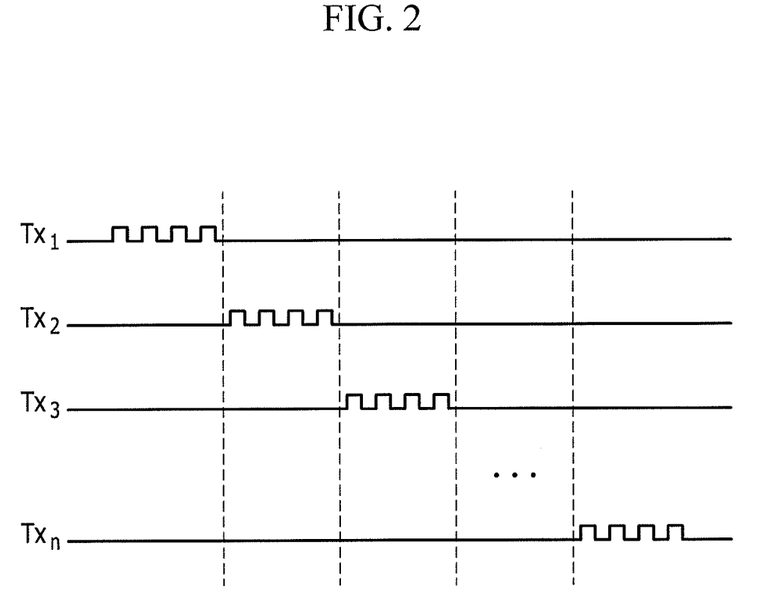
FIG. 2 illustrates an example of the timing for applying a touch signal to a plurality of channels of a display panel.

FIG. 2 illustrates an embodiment for applying a touch driving signal to channels of a display panel. A capacitive-type touch sensor may include a Tx electrode arranged in a first axial direction and an Rx electrode arranged in a second axial direction. The touch driving unit applies a touch driving signal to the Tx electrode according to a predetermined touch driving frequency. The touch driving unit may apply the touch driving signal, for example, in synchronization with the horizontal synchronizing signal Hsync or the vertical synchronization signal Vsync, or may independently apply the touch driving signal.

Referring to FIG. 2, the timing for applying a voltage to each of the touch signal channels Tx1, Tx2, . . . , TxN varies. The touch driving signal is applied to the first line Tx1 of the display panel, and then the touch driving signal is applied to the second line Tx2. When the last line of the display panel is an N-th line, the touch driving signal is applied to the N-th line TxN. Thus, the touch driving signal is applied to the entire display panel.

The frequency for applying the touch driving signals from the first line to the N-th line may be referred to as a touch report rate. In one embodiment, the touch signal channels may be in one-to-one correspondence with the lines of the pixels of the display panel, and may be controlled in an independent manner. Also, in one embodiment, the touch report rate may coincide with the display frame rate, but may be controlled in an independent manner.

Hereinafter, an embodiment is described which is based on the assumption that the touch driving signal to be applied is synchronized with the horizontal synchronizing signal Hsync.

Figure 3:
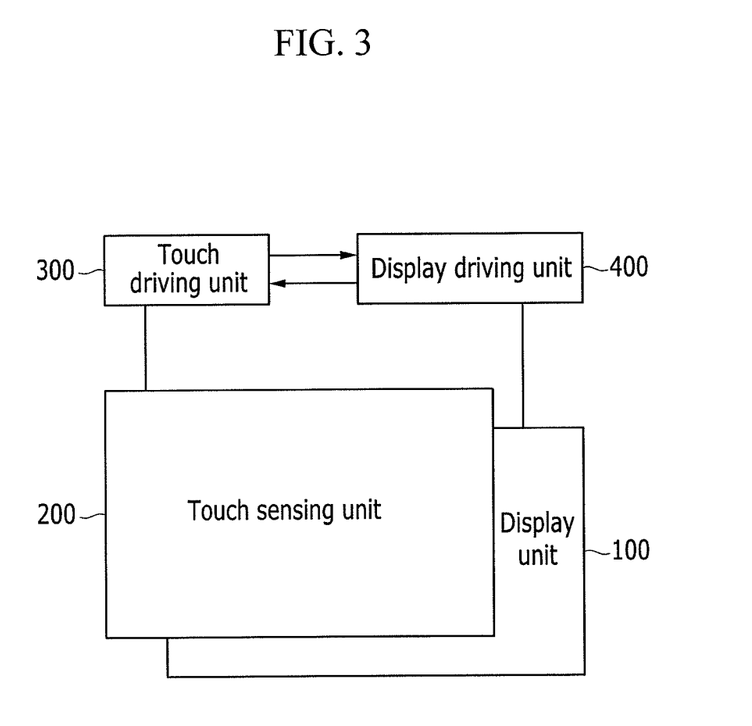
FIG. 3 illustrates an embodiment of a display device having a touch panel.

FIG. 3 illustrates an embodiment of a display device having a touch panel. Referring to FIG. 3, the display device includes a display unit 100, a touch sensing unit 200, a touch driving unit 300, and a display driving unit 400.

The display unit 100 may any one of a variety of types for outputting still images and/or motion pictures. Examples include a liquid crystal display, a light emitting diode display, and an organic light emitting diode display.

The touch sensing unit 200 includes touch sensors which may be any one of a variety of types, including but not limited to a resistive type, a capacitive type, an electromagnetic (EM) type, or an optical type. In one embodiment, the touch sensing unit 200 includes sensing electrodes which include a Tx electrode arranged in a first axial direction and an Rx electrode arranged in a second axial direction. The touch driving unit 300 may apply a touch driving signal to the Tx electrode according to a predetermined touch driving frequency. Also, the touch sensing unit 200 may be an in-cell or on-cell type. Accordingly, the display unit 100 and the touch sensing unit 200 may be integrally formed.

The touch driving unit 300 may be implemented as an integrated circuit Touch-IC. Accordingly, all controls related with the touch operation, as well as the function of applying the touch driving signal to the Tx electrode, may be performed. In the present embodiment, the touch driving unit 300 is synchronized with the horizontal synchronizing signal Hsync, which is transmitted from the display driving unit 400, for applying the touch driving signal to the Tx electrode of the touch sensing unit 200.

The display driving unit 400 may be implemented, for example, as a display driver IC (DDI). The display driving unit 400 may include, for example, a timing controller T-CON, a gate driver, and a source driver.

The touch driving unit 300 may determine whether noise is generated from the sensed touch signal. When it is determined that noise exists in the touch signal, the touch driving unit 300 transmits a control signal of the display porch time to the display driving unit 400. The control signal of the display porch time may be, for example, a V-Porch variable signal or a frequency hopping request signal.

The control signal of the display porch time may correspond to one or more pulses. In the present embodiment, the control signal of the display porch time may correspond to one pulse. When the display driving unit 400 receives the pulse, frequency hopping is performed by one of a plurality of prepared frequencies. When the touch driving unit 300 applies the pulse again, the display driving unit 400 receives the pulse and performs frequency hopping at a different one of the prepared frequencies.

Additional immunity for other noise, except for the display noise, may be ensured through the frequency hopping.

In one embodiment, frequency hopping may be performed by changing the display porch time. For example, when the display frame rate is maintained and the display porch time is changed, the display time is also changed. For example, when the display porch time is decreased, the display time is increased. Conversely, when the display porch time is increased, the display time is decreased (see FIG. 1).

In another embodiment, a value different from the display frame rate may be used as a reference. The display time has a fixed number of pulses of the horizontal synchronizing signal Hsync. Accordingly, when the display time is changed, the cycle of the horizontal synchronizing signal Hsync is changed.

In this case, the timing for applying the touch driving signal, synchronized with the horizontal synchronizing signal Hsync, may also vary. As a result, the frequency of the touch driving signal may also vary. Thus, when the display porch time is decreased, the frequency of the touch driving signal is decreased; and when the display porch time is increased, the frequency of the touch driving signal is increased. Examples of these and other effect are described, for example, with reference to FIGS. 6 and 7.

Figure 4:
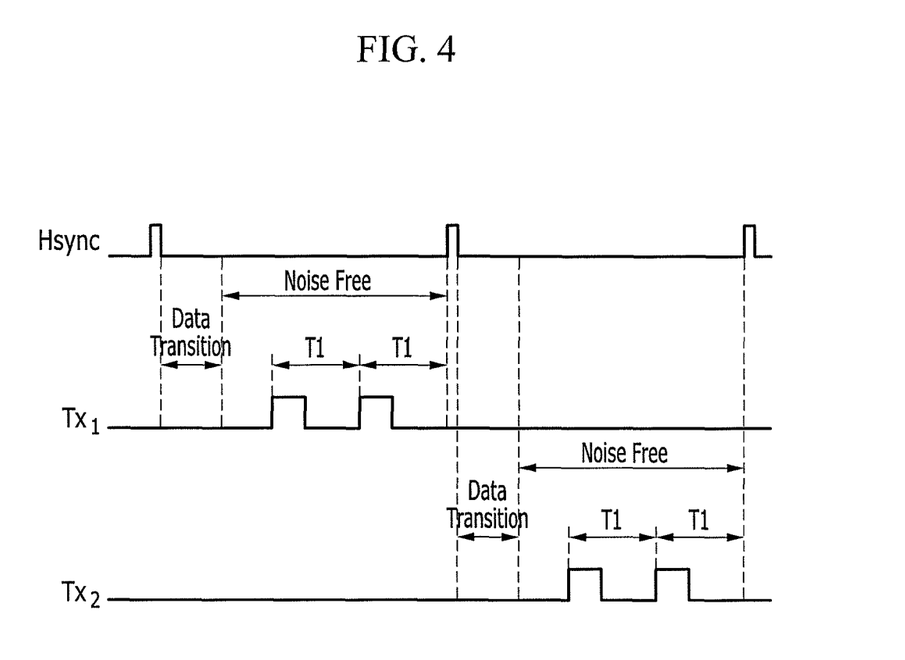
FIG. 4 illustrates an example of a period before first modulation.

FIG. 4 illustrates a period before first modulation is performed according to one embodiment. More specifically, referring to FIG. 4, a period of two cycles of the horizontal synchronizing signal Hsync and timings of pulses applied to the touch signal channels Tx1 and Tx2 according to the period are illustrated as an example. The pulse of the horizontal synchronizing signal Hsync is referred to as a first pulse, and the pulse of the touch driving pulse of each touch signal channel is referred to as a second pulse.

Each of the touch signal channels Tx1 and Tx2 includes a pulse group including N second pulses. In the embodiment of FIG. 4, each pulse group includes two second pulses. After the first pulse of the horizontal synchronizing signal Hsync is generated, a data transition period may be set. The data transition period may correspond to a period when the voltage is applied to a data line and a gate line.

The data line and the gate line may have an adverse effect on the touch signal sensing, by forming the touch electrodes Tx and Rx and a capacitor. As a result, display noise may be generated. The display noise may be expected based on the driving type of the panel. Accordingly, the touch driving signal may be applied for another noise free period, except for the data transition period.

The data transition period and the noise free period may be differently set, for example, according to the display device and driving type. Each pulse has a rising edge and a falling edge. However, because the sequential order of the rising edge and the falling edge may vary according to a voltage applying method, in this embodiment an earlier edge is referred to as a first edge and a next edge is referred to as a second edge.

Referring to FIG. 4, the pulse group of the touch driving signal of each of the touch signal channels Tx1 and Tx2 is temporally positioned at the noise free period. This is to avoid display noise expected as described above.

The second pulses of the pulse group have cycles based on a period T1. For example, the period T1 corresponds to the distance from the first edge of one second pulse to the first edge of an adjacent second pulse. In one embodiment, the first distance may be constant. In this case, the distance from the first edge of the N-th second pulse of the pulse group to the first edge of the pulse which starts the next cycle of the horizontal synchronizing signal Hsync may be the first distance.

In the embodiment of FIG. 4, the first modulation may be performed by changing the first distance, for example, as described with reference to FIG. 5.

Figure 5:
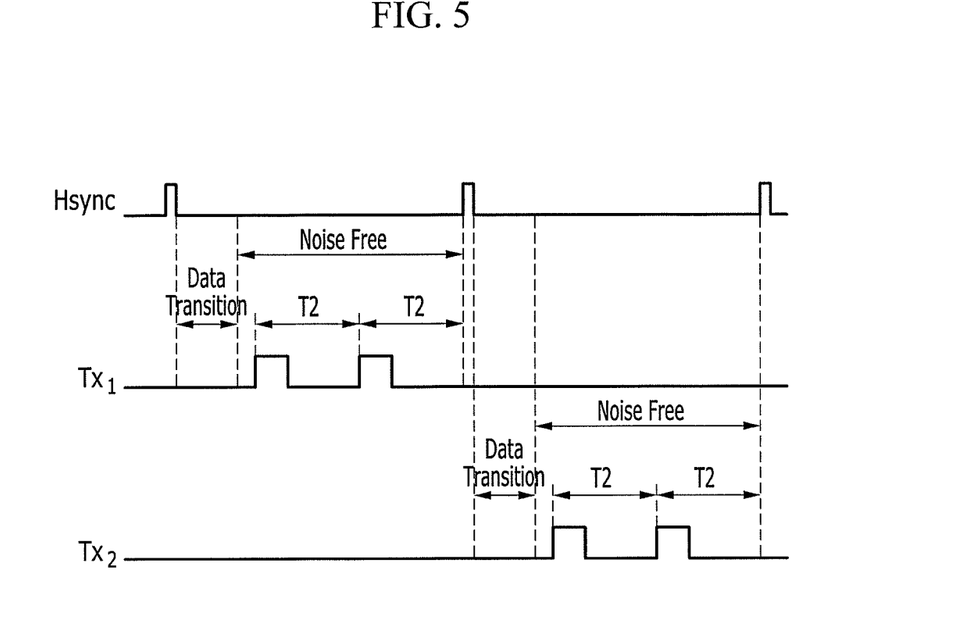
FIG. 5 illustrates an example of a period after the first modulation.

FIG. 5 illustrates an example of a period after the first modulation. Referring to FIG. 5, the data transition and noise free periods are not changed based on the horizontal synchronizing signal Hsync. However, the first distance is increased from T1 to T2. According to the embodiment of FIG. 5, when the first distance is extended, the touch driving frequency is decreased. When the first distance is decreased, the touch driving frequency is increased.

In this case, the first distance may be set so that the first edge of the first second pulse of each pulse group is not included in the data transition period and exists in the noise free period. Also, in this case, the first distance may be set so that the first distance from the last second pulse of each pulse group (e.g., the first edge of the N-th second pulse) is not beyond the first edge of the first pulse starting the next cycle of the horizontal synchronizing signal Hsync.

Figure 6:
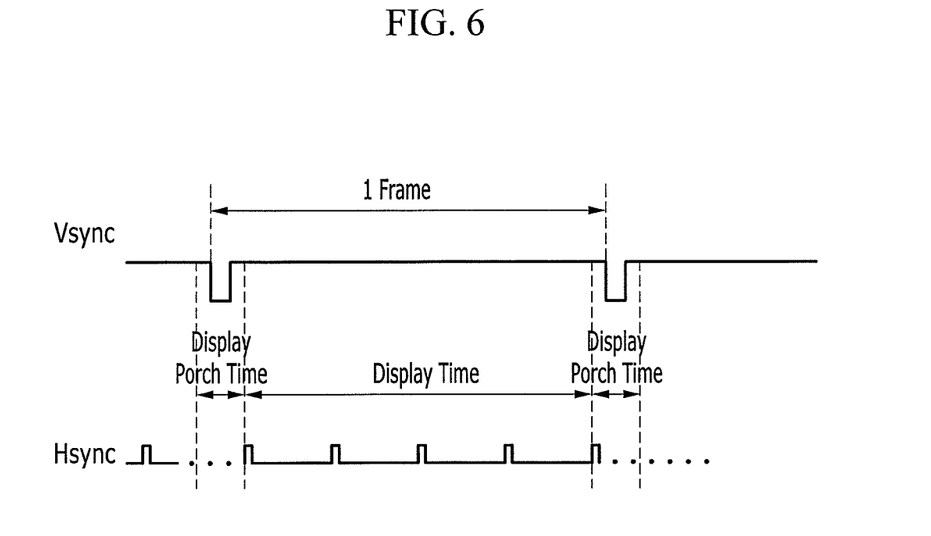
FIG. 6 illustrates an example of a period before second modulation.

FIG. 6 illustrates an example of a period before second modulation is performed. In FIG. 6, timings for applying the vertical synchronization signal Vsync and the horizontal synchronizing signal Hsync are illustrated. As described above, in one embodiment, the number of pulses of the horizontal synchronizing signal Hsync in display time 1 period may be set to correspond to the number of lines of the display panel. In FIG. 6, four lines are illustratively displayed for the display panel, and thus four pulses of the horizontal synchronizing signal Hsync are applied in the display time.

Figure 7:
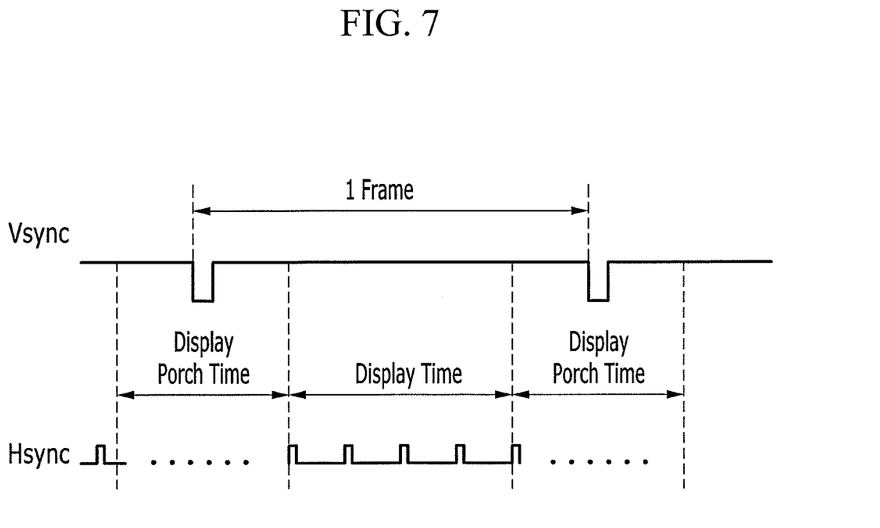
FIG. 7 illustrates an example of a period after the second modulation.

FIG. 7 illustrates an example of a period after the second modulation is performed. Referring to FIG. 7, as compared with FIG. 6, the display porch time is increased and the display time is decreased. In this case, when the display frame rate is maintained, the length of 1 frame may also be maintained. Also, as described above, the display time has a fixed number of pulses of the horizontal synchronizing signal Hsync. Accordingly, when the display time is changed, the cycle of the horizontal synchronizing signal Hsync (e.g., 1 horizontal period) is changed.

Also, in FIG. 7, the number of pulses of the horizontal synchronizing signal Hsync is maintained as four, but the interval between the pulses is decreased. In this case, the timing for applying the touch driving signal, synchronized with the horizontal synchronizing signal Hsync, also varies. As a result, the frequency of the touch driving signal also varies. Also, like FIG. 7, when the display porch time is increased, the frequency of the touch driving signal is increased; and when the display porch time is decreased, the frequency of the touch driving signal is decreased.

Figure 8:
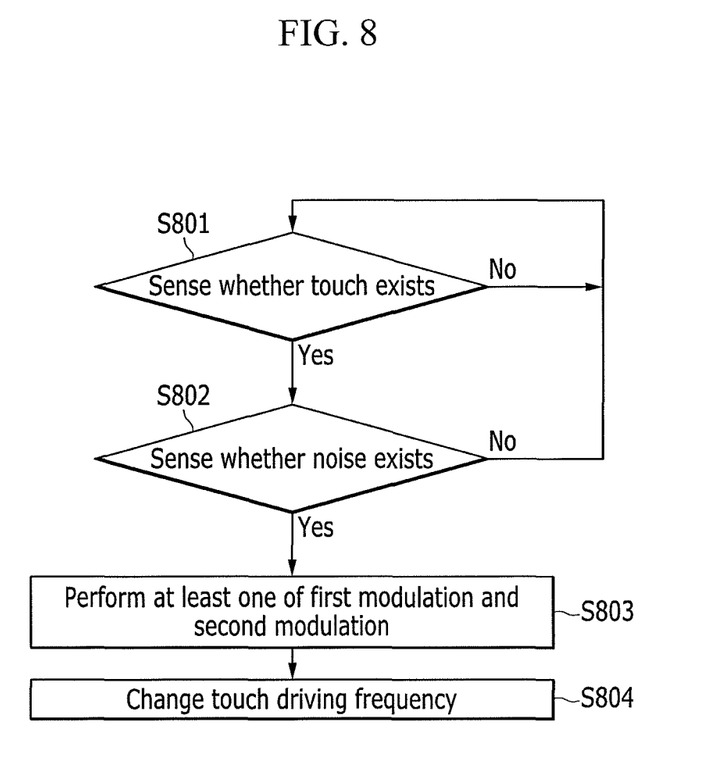
FIG. 8 illustrates an embodiment of a method for changing the touch driving frequency in a display device.

FIG. 8 illustrates an embodiment of a method for changing the touch driving frequency. Referring to FIG. 8, the method converts the touch driving frequency by sensing whether a touch exists (S801), sensing whether noise exists (S802), performing at least one of a first modulation or a second modulation (S803), and changing the touch driving frequency (S804).

More specifically, the touch sensing unit 200 may sense the user touch, for example, based on a change in capacitance in the Tx electrode and the Rx electrode (S801). In this case, noise having a predetermined threshold or more may be detected (S802). This may be performed by operation of the Touch-IC of touch driving unit 300.

The touch driving unit 300 may perform the first modulation when it is determined that modulation of the touch driving frequency is to be performed. Further, the touch driving unit 300 transmits the control signal of the display porch time to the display driving unit 400, to receive the changed horizontal period signal Hsync. In this case, because the touch driving signal is synchronized with the horizontal period signal Hsync, the second modulation is performed.

Only one of the first modulation or the second modulation may be performed in one embodiment. In another embodiment, both the first modulation and the second modulation may be performed. The touch driving frequency is changed through at least one of the first modulation or the second modulation (S804).

In the present embodiment, when the touch driving signal is synchronized with the horizontal synchronizing signal Hsync, and even when the touch driving signal is synchronized with the vertical synchronization signal Vsync, frequency hopping according to one or more of the aforementioned embodiments may be performed. Also, even in the case where the touch driving signal is synchronized with the vertical synchronization signal Vsync, when the length of the display porch time is changed, frequency conversion of the touch driving signal may be performed.

The methods, processes, and/or operations described herein may be performed by code or instructions to be executed by a computer, processor, controller, driver, or other signal processing device. The computer, processor, controller, driver, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

By way of summation and review, in one type of display device, a touch driving signal is synchronized with a horizontal synchronizing signal Hysnc, because the touch driving frequency cannot be varied. Thus, it is difficult to avoid noise.

In accordance with one or more embodiments, a touch driving unit determines whether noise is generated in and/or from the sensed touch signal. When it is determined that noise exists in the touch signal, the touch driving unit transmits a control signal of the display porch time to the display driving unit.

In accordance with these or other embodiments, a method is provided for improving signal-to-noise ratio (SNR) for external noise as well as display noise, by changing a driving frequency for applying a touch driving signal synchronized with a horizontal synchronizing signal.

In accordance with these or other embodiments, the control signal of the display porch time may be a V-Porch variable signal or a frequency hopping request signal. The control signal of the display porch time may be configured, for example, by one pulse, When the display driving unit 400 receives the pulse, frequency hopping is performed by one of the prepared frequencies. When the touch driving unit applies the pulse again, the display driving unit receives the pulse to perform frequency hopping at a prepared different frequency.

Additional immunity for other noise, except for the display noise, may be ensured through the frequency hopping. The frequency hopping may be performed by changing the display porch time. As a result, when the display porch time is decreased, the frequency of the touch driving signal is decreased; and when the display porch time is increased, the frequency of the touch driving signal is increased.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A method for converting a driving frequency of a touch panel, the method comprising:
   receiving a control signal for a display porch time;
   changing the display porch time based on the control signal;
   changing a duration of a display time based on the changed display porch time;
   changing a frequency of a horizontal synchronizing signal based on the changed display porch time; and
   generating a touch driving signal synchronized with the horizontal synchronizing signal.

2. The method as claimed in claim 1, further comprising:
   maintaining a display frame rate.

3. The method as claimed in claim 1, wherein changing the display porch time includes changing a total time of the display porch time in a frame period.

4. A display device with a touch panel, comprising:
- a display to display an image;
- a touch sensor to sense a touch;
- a driver to control the display; and
- a touch driver to provide a touch driving signal to the touch sensor, the touch driving signal synchronized with a horizontal synchronizing signal, wherein the touch driver is to provide a control signal of a display porch time to the driver, and wherein the driver is to change the display porch time based on the control signal and is to change a frequency of the horizontal synchronizing signal based on the changed display porch time.

5. The display device as claimed in claim 4, wherein changing the display porch time changes a cycle of the horizontal synchronizing signal.

6. The display device as claimed in claim 5, wherein the driver changes the display porch time while a display frame rate is maintained.

7. The display device as claimed in claim 4, wherein the touch driver is to change a total time of the display porch time in a frame period.

8. A method for converting a driving frequency of a touch panel, the method comprising:
- changing a display porch time;
- changing a cycle of a horizontal synchronizing signal based on the changed display porch time;
- converting a frequency of the touch driving signal synchronized with the horizontal synchronizing signal, which includes a first pulse that repeats at a substantially constant cycle, wherein the touch driving signal includes N second pulses temporally positioned in a corresponding cycle of the horizontal synchronizing signal, a first distance from a first edge of one of the second pulses to a first edge of an adjacent one of the second pulses substantially constant, and wherein converting the frequency of the touch driving signal includes changing the first distance while maintaining a duration of each of the second pulses.

9. The method as claimed in claim 8, further comprising:
receiving a control signal for the display porch time; and
changing the display porch time based on the control signal.

10. The method as claimed in claim 8, wherein a distance from the first edge of the N-th second pulse to the first edge of a first pulse starting a next cycle of the horizontal synchronizing signal is greater than the first distance.

11. The method as claimed in claim 8, wherein a distance from the first edge of the N-th second pulse to the first edge of a first pulse starting a next cycle of the horizontal synchronizing signal substantially equals the first distance.

12. The method as claimed in claim 8, wherein the N second pulses are positioned in a corresponding period of the horizontal synchronizing signal in a non-overlapping relationship with an expected noise period.

13. The method as claimed in claim 12, wherein the expected noise period is a noise period expected to be generated by applying at least one of a data signal or a gate signal.

14. The method as claimed in claim 8, wherein $N \geq 1$.

* * * * *